United States Patent [19]
Willis et al.

[11] 3,854,616
[45] Dec. 17, 1974

[54] SIDE-LOADING ATTACHMENT FOR FORKLIFT TRUCKS

[76] Inventors: Wilfred Ernest Willis, 3633 Jackson, San Francisco, Calif. 94118; Dickie L. Johnston, 10944 Ridgeview Ave., San Jose, Calif. 95127

[22] Filed: Sept. 20, 1972

[21] Appl. No.: 290,637

[52] U.S. Cl............. 214/620, 214/16.4 R, 214/730
[51] Int. Cl............................ B65g 1/06, B66f 9/14
[58] Field of Search .......... 214/730, 731, 620, 621, 214/16.4 R, 16.4 A

[56] References Cited
UNITED STATES PATENTS

| | | | |
|---|---|---|---|
| 3,071,268 | 1/1963 | Wales | 214/620 |
| 3,180,512 | 4/1965 | Moss | 214/620 |
| 3,357,582 | 12/1967 | Wihek | 214/730 X |
| 3,549,025 | 12/1970 | Messner | 214/16.4 R |
| 3,561,620 | 2/1971 | Willis | 214/620 X |

*Primary Examiner*—Robert J. Spar
*Assistant Examiner*—Leslie J. Paperner
*Attorney, Agent, or Firm*—Owen, Wickersham & Erickson

[57] ABSTRACT

An attachment for forklift trucks can be used in conjunction with load-supporting pallets and pallet-supporting storage racks to give side-loading and side-unloading. The attachment has a base frame with fork-receiving sockets and screw means for locking inserted forks against the top walls of the sockets, a laterally disposed stabilizer supported by and above the frame for movement laterally thereof, and a pallet-and-load supporting platform above the stabilizer pivotally supported by the frame for movement laterally thereof. An electrically actuated hydraulically driven mechanism moves the stabilizer by means of a wire rope system to either side of the frame for engagement with and rest upon a pallet-supporting storage device, on which a pallet and its load are to be deposited, and a similar mechanism moves the platform thereafter out where it lies wholly beyond the forklift truck and the stabilizer, doing so only after the stabilizer is properly supported by the pallet-supporting storage device, preferably as determined by a pressure-operated switch. Hydraulic jacks enable tipping of the pivoted platform for preventing contact of the load-supporting pallet with the storage device during the sidewise movement and for enabling retraction of the platform from the load when the load is on the storage device, as well as enabling the platform to get under the pallet to pick it up from the storage device.

14 Claims, 25 Drawing Figures

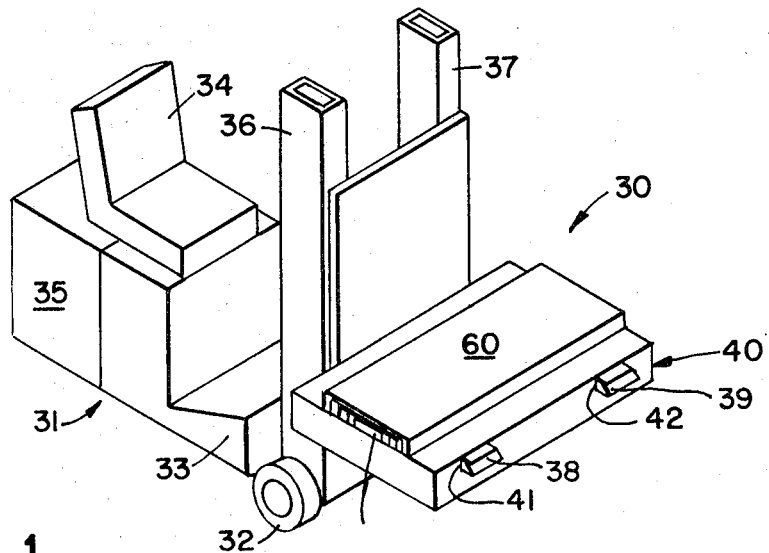
FIG_1
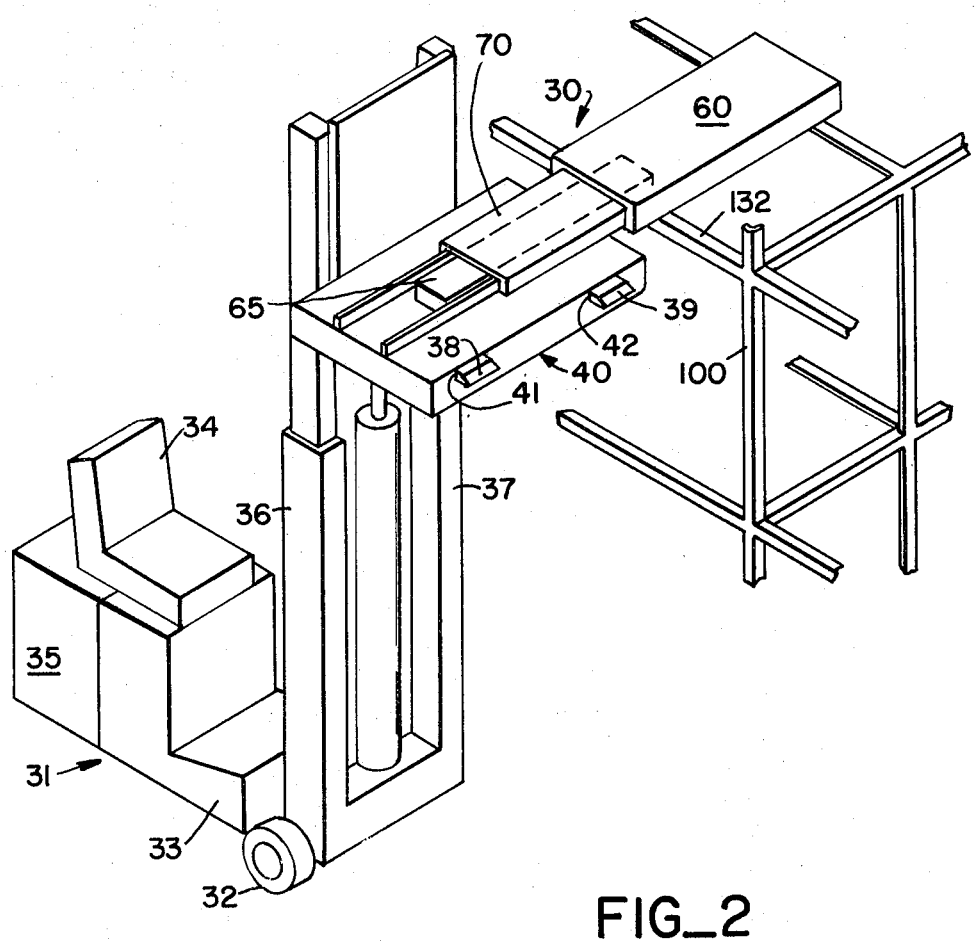
FIG_2

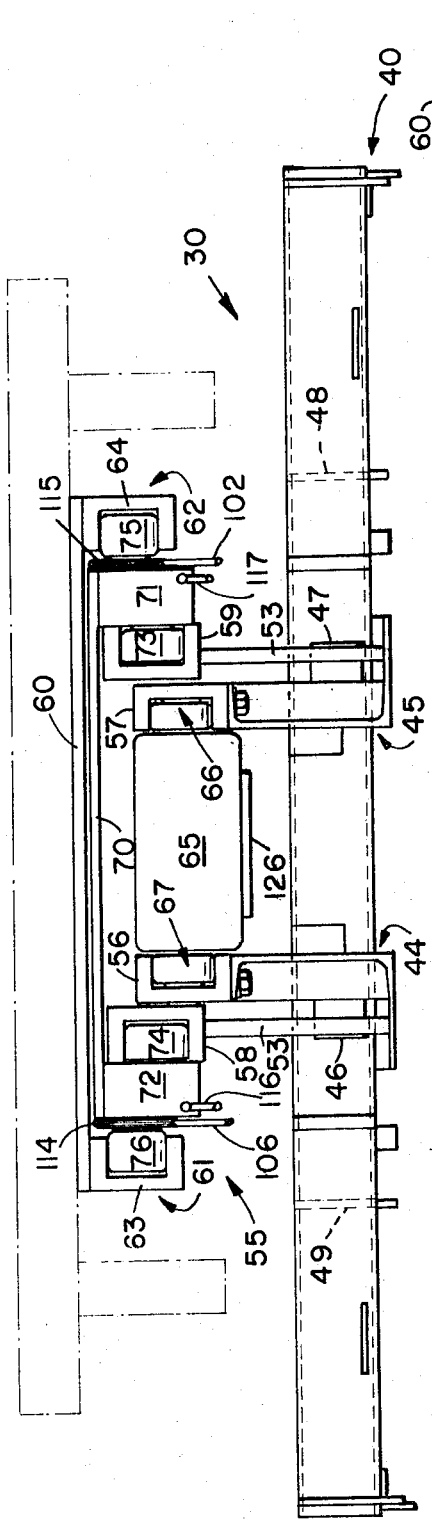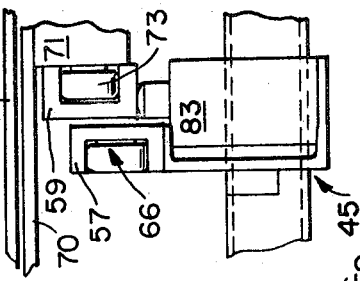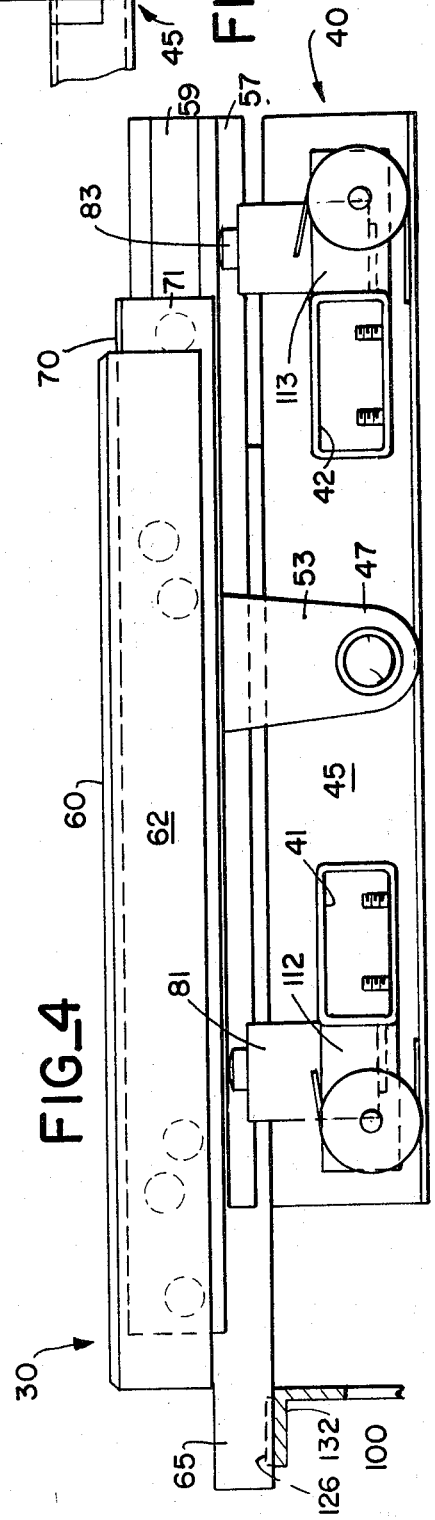

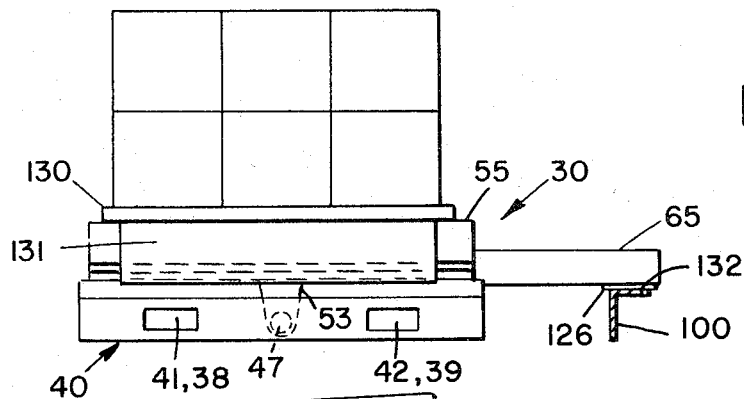
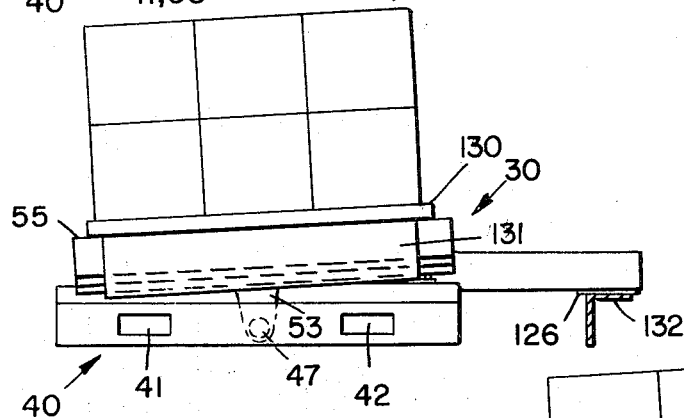
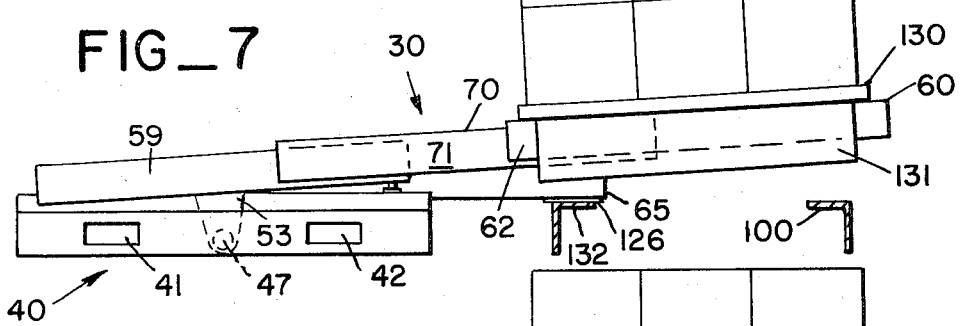
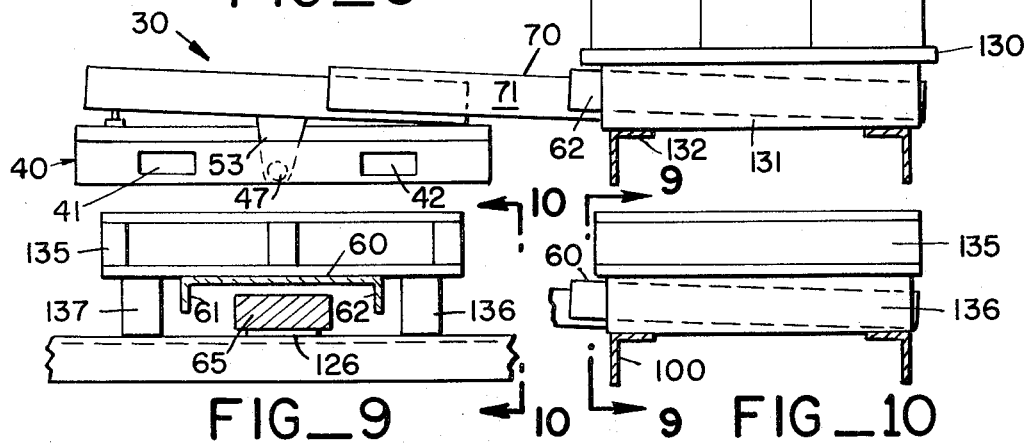

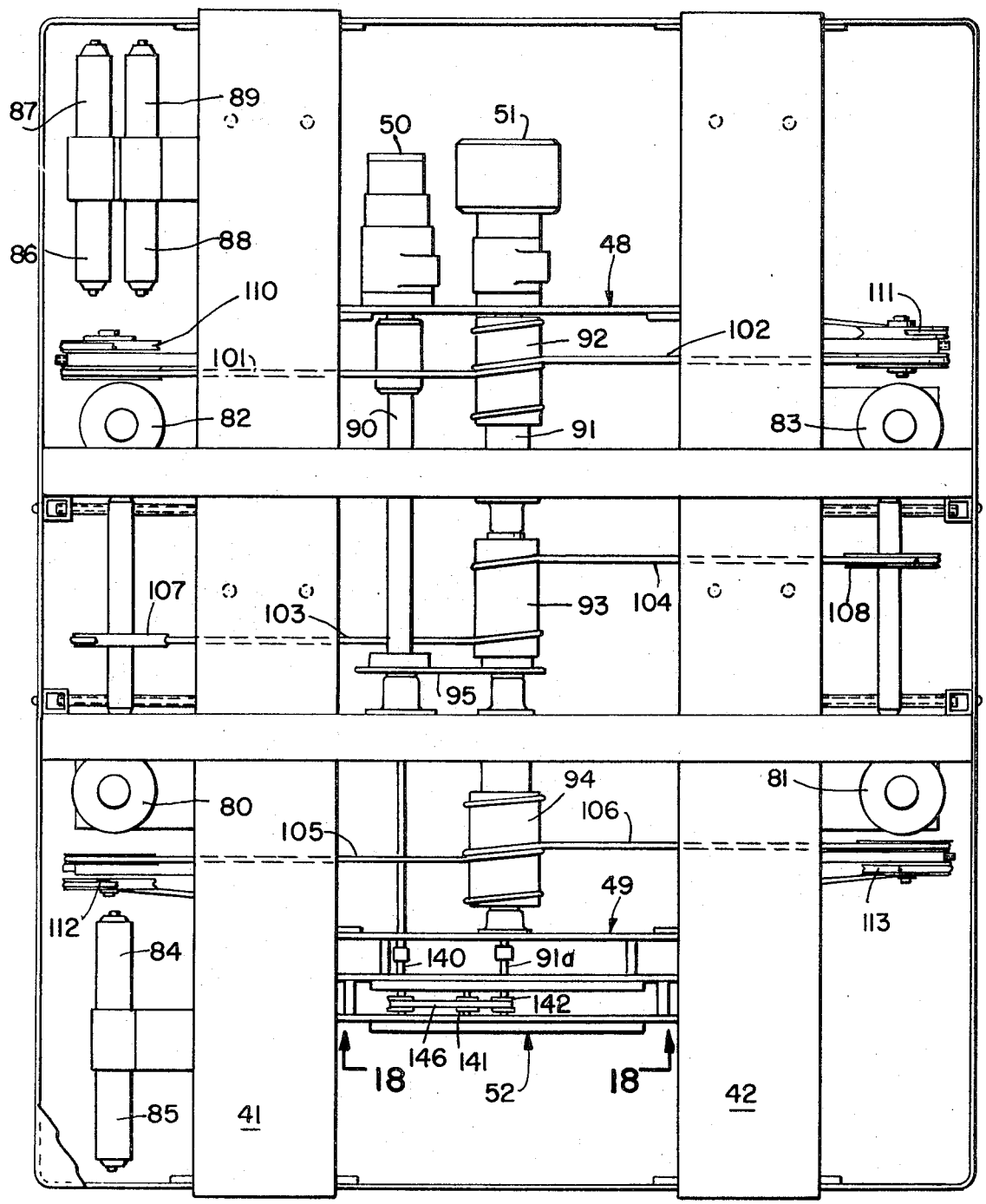
FIG_11
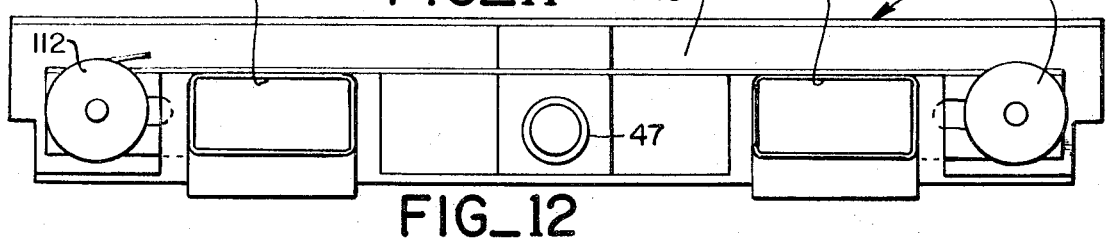
FIG_12

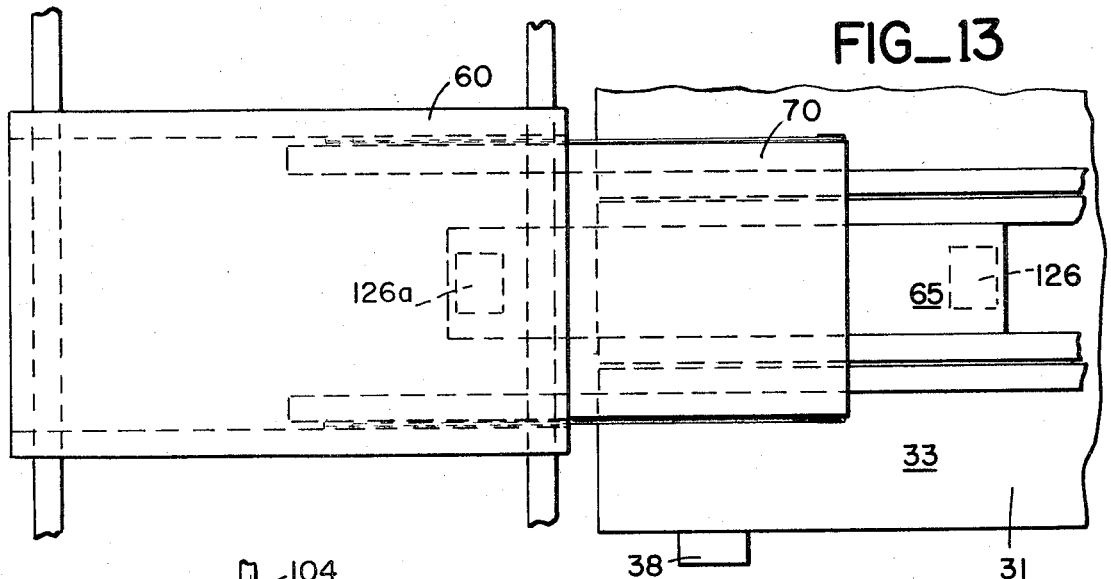
FIG_13
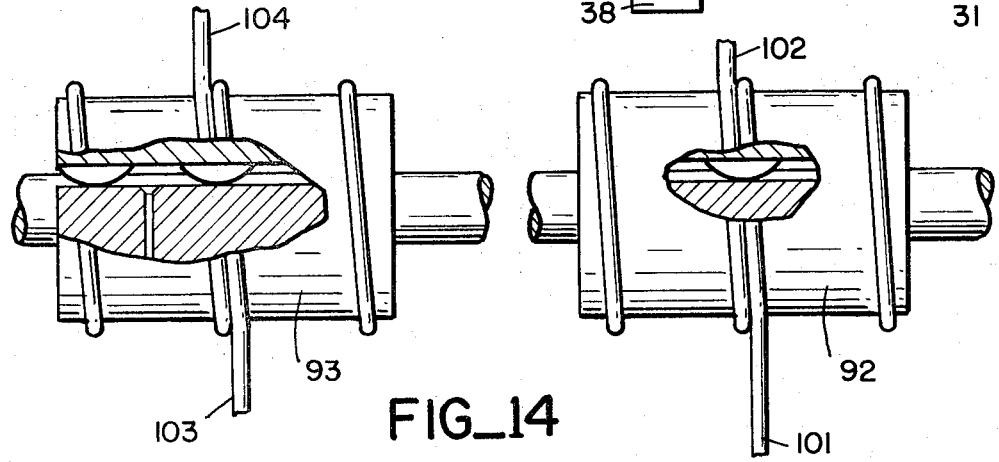
FIG_14
FIG_15 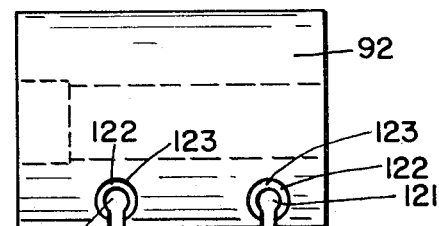
FIG_17 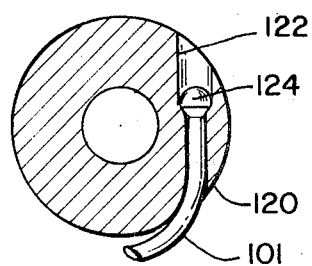
FIG_16 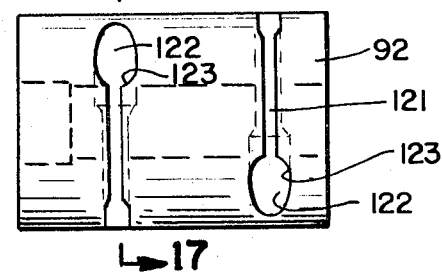

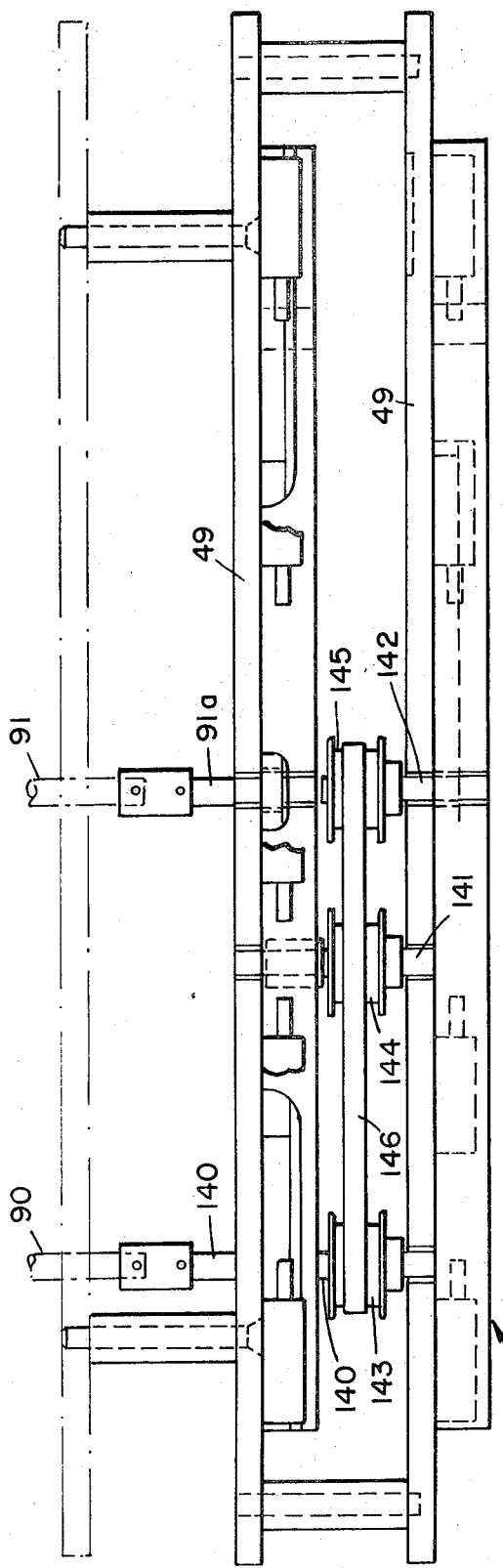
FIG_19
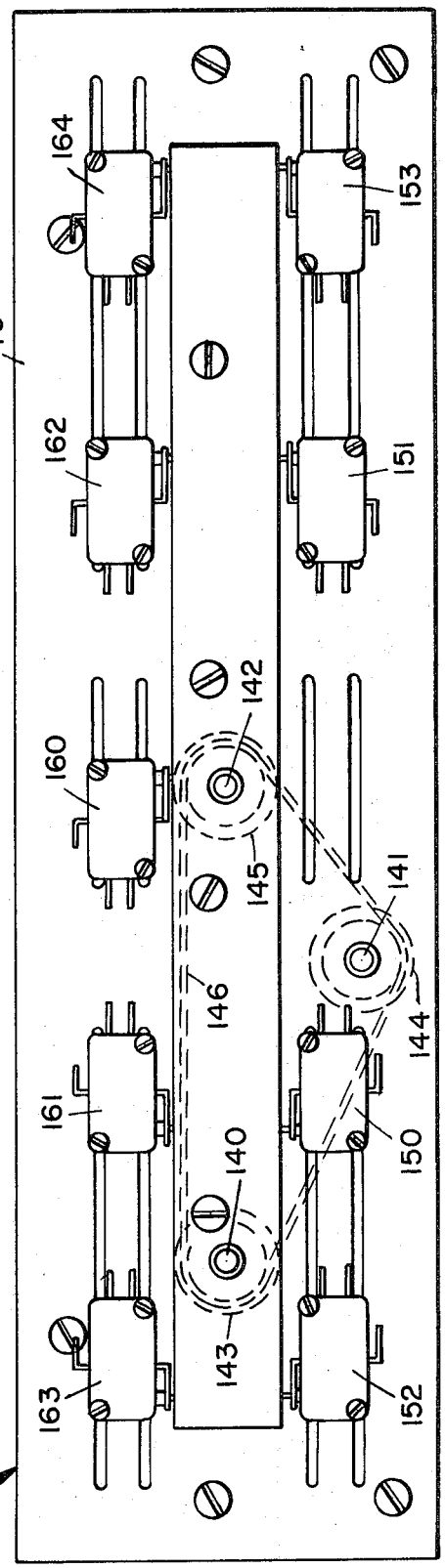
FIG_18

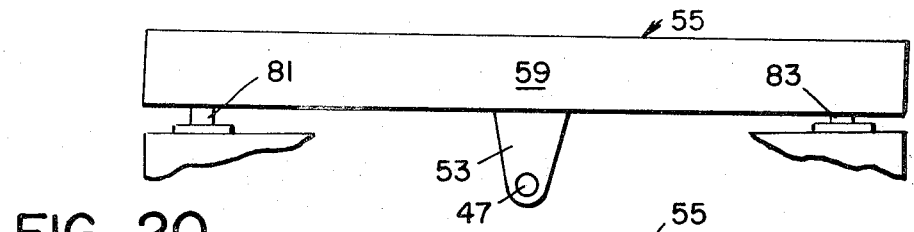
FIG_20
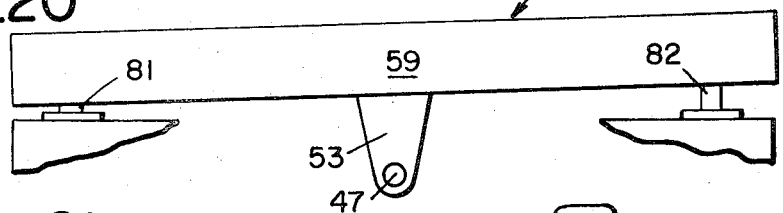
FIG_21
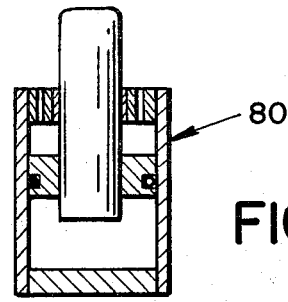
FIG_22
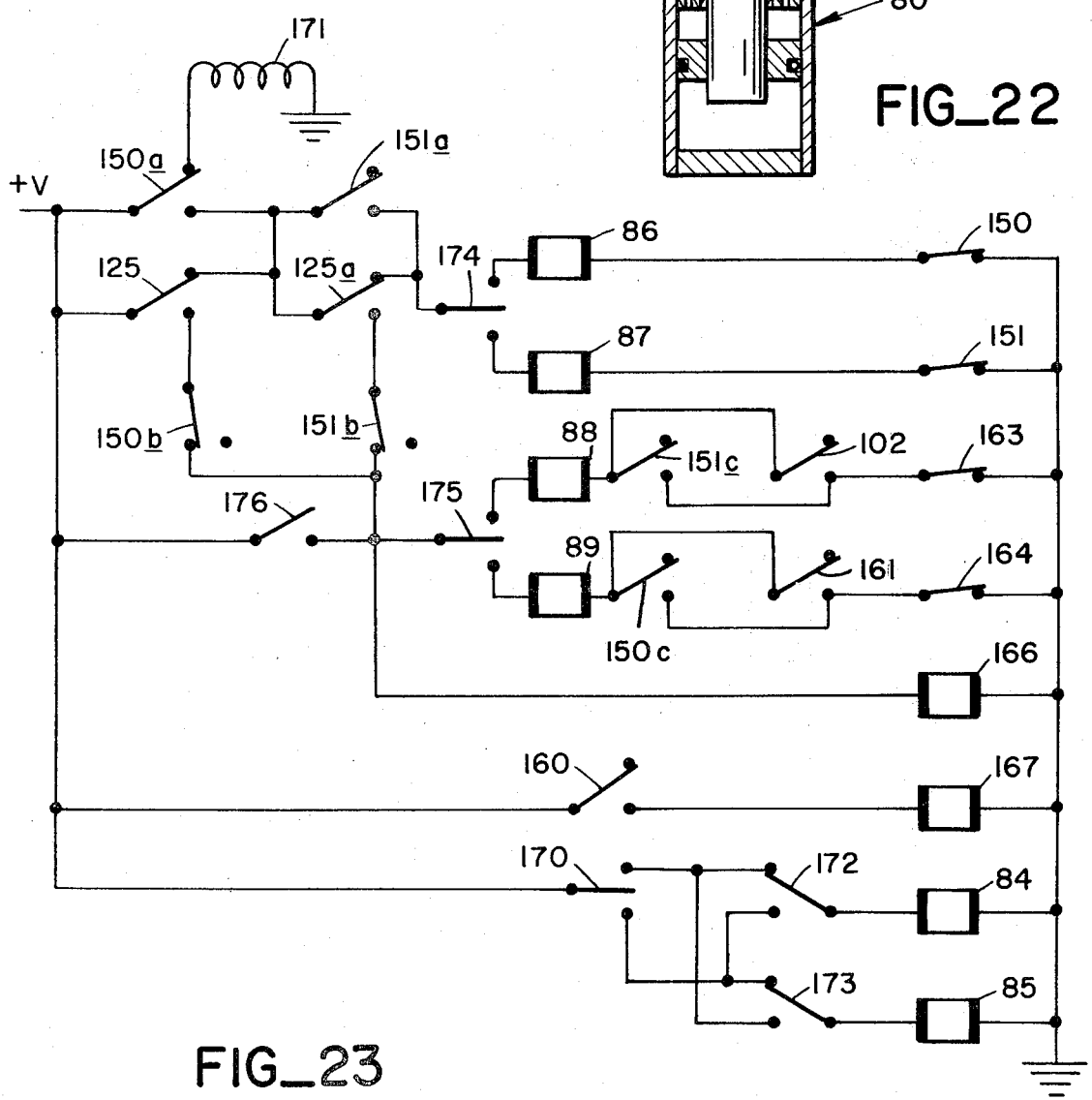
FIG_23

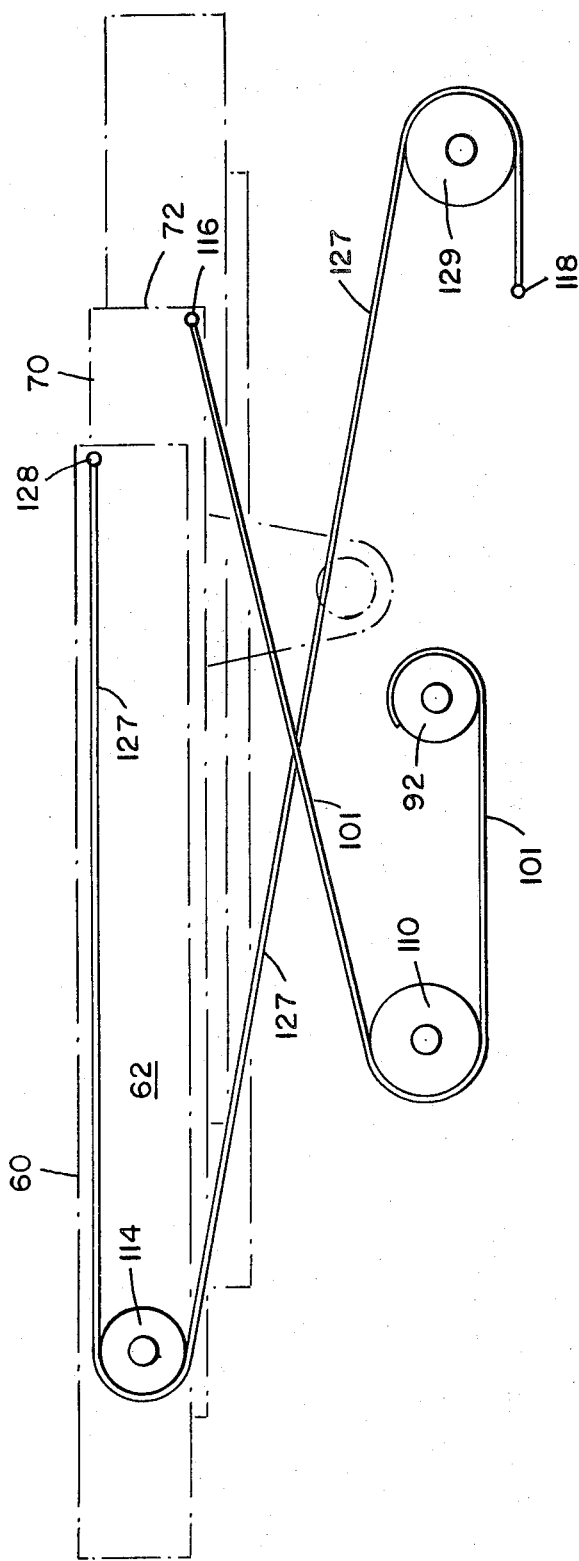
FIG_24

SIDE-LOADING ATTACHMENT FOR FORKLIFT TRUCKS

BACKGROUND OF THE INVENTION

This invention relates to a side-loading attachment for forklift trucks.

The present invention is an improvement on the side-loading attachment for forklift trucks shown in the Wilfred Ernest Willis Pat. No. 3,561,620, issued Feb. 9, 1971.

Normal forklift trucks pick up and discharge their loads in a line with the fore-and-aft axis of the forklift truck. As a result, the use of forklift trucks and pallet loads, though economical of manpower, has required large storage spaces in warehouses, because the forklift trucks have had to be maneuvered, turned to each side, and turned around. Because of the direction of discharge, wide aisles have had to be provided, so that the truck could be turned to head toward the selected spot where it was to pick up or deposit its load. Thus, a very large portion of the floor space of the warehouses was given over to aisle passageways, which were there only to enable the maneuvering of the forklift truck. In contrast with this, the present invention, as well as the predecessor of which it is an improvement, provides for loading and unloading the forklift truck along an axis perpendicular to the fore-and-aft axis of the truck, the forklift truck being provided with an attachment which moves out to the side to pick up loads or to deposit them. Thus, the aisles can be narrow and a great deal of space saved.

When the loaded pallet is moved out to one side of the forklift truck, by means of a side-loading attachment, a moment is created which tends to overturn the truck and also tends to wrack the truck's mast. It is important that this moment be so dealt with that these tendencies cannot result in any such wracking or overturning. In the predecessor invention an embodiment was shown which dealt with this problem by projecting out a stabilizer which engaged the storage device (such as a rack) where the pallet was to rest and did so usually at two points, one of which lay well beyond the center of gravity of the load even when that load had been moved as far to the side as it could go. This two-point stabilization and especially the stabilization at one point beyond the center of gravity of the load was effective. While it was not essential to the invention claimed therein, it was the illustrated and the then-preferred embodiment.

The present invention proposes solving that problem in another way having some cost advantages, and it does so without having to extend the stabilizer out so far. In fact, it need be moved out only far enough to engage the storage rack at the closest point to the forklift truck. Hence, the present invention has the object of overcoming the wracking and overturning tendency of the outboard movement without having to extend the stabilizer out beyond the center of gravity of the load and without having to support the stabilizer at more than one point and with having greater visibility of the one point of support.

In other words, the point where the stabilizer is supported on the storage device is inboard of the center of gravity of the load after the load has been moved out fully to one side (or before such a load is picked up), and the point where the stabilizer rests on the storage device tends to act as a fulcrum point; the present invention provides a novel system for opposing the moment that tends to overturn or wrack the forklift truck. Thereby, time can be save in maneuvering, and another object of the present invention is to accomplish this, and also to provide safety interlocks which can prevent the platform from being moved to either side until the stabilizer is in position and is also properly supported.

In the illustrated embodiment of the former invention, series of gears were shown for driving the device. It has now been found that more strength is needed when working with heavy loads than such a gear system can normally provide. Gear teeth tend to break under heavy loads, particularly shock loads from inertial forces associated with the sudden stopping of the platform when it is heavily loaded. Gears also tend not to produce the necessary evenness of operation. Therefore, the present invention has as one of its objects the provision of a new drive mechanism involving wire ropes.

SUMMARY OF THE INVENTION

As in the prior invention, the stabilizer is supported above the base frame for movement only laterally thereof, while the load-supporting platform is supported pivotally by the base frame, with two pairs of hydraulic jacks between the platform and the base frame for enabling tilting of the platform. This tiltability of the platform is used to assure clearance of pallet skids above a storage rack during manipulation of loaded skid pallets, and also to assure clearance of loaded double-faced pallets or simple slabs from supporting boards placed on the storage rack when such pallets or slabs are used.

In the present invention the lateral movements of the stabilizer and the lateral movements of the load-supporting platform are both accomplished by separate hydraulic motors driving a series of aligned drums that act on wire ropes, a pair thereof for each drum. Direction-determining solenoids control the direction of rotation of the motors, and a safety interlock system gives the needed controls with the needed safety.

A very important feature of the present invention is that the forks of the forklift truck are locked to the attachment so that there can be no relative moment between the forks and the attachment so long as the attachment is being used. A series of screws can be used to make this securement. As a result, neither fork can be rotated or wracked relative to the other, and the forks are thus used to provide a force acting downward on the attachment and hence upward on the forks which balances the force from the load on the platform as it moves outboard of the support provided by the stabilizer. The outward motion of the load without the use of the stabilizer would create a moment tending to overturn the truck. The single point support of the stabilizer changes the overturning moment to an upward force acting on the frame of the attachment as the center of the load moves outboard of the center of stabilizer support. The fulcrum point provided by the stabilizer combined with the fork-locking screws eliminates the moment, which tends to overturn the truck or to wrack its mast; it also enables opposing the force of the load with the entire truck frame and the entire dead weight of the truck — always greater than the weight of the load. Wracking and overturning are both prevented, and stabilization is achieved even though the stabilizer is not moved out very far.

In a preferred form of this invention, the stabilizer is provided adjacent each end with a pressure-actuated switch on its lower surface, having a large-area actuating plate. This switch is connected into the electrical control for the hydraulic system used for lowering the mast and forks of the forklift truck to which the attachment is applied, and is also interlocked with the controls for the platform-moving motor. The stabilizer can thus be visually aligned by the operator to be slightly higher than a rack member he selects, then moved out laterally to actually overlie that rack member, and then the mast and forks lowered to provide contact of the stabilizer end portion with the rack member and trip the switch. The switch then automatically prevents further lowering of the forks and mast, and the stabilizer is in a stabilizing position. Then and only then can (so long as this preferred system is being used) the load-supporting platform be moved laterally, and it can be moved only out on the same side as the stabilizer. This is true whether the platform is already carying a pallet and load or whether it is to pick up a pallet and load from the rack.

A manual override system is provided for use in emergencies or in special situations, enabling the operator to override the safety interlocks when appropriate or necessary.

Other objects and advantages of the invention will appear from the following description of a preferred form thereof.

BRIEF DESCRIPTION OF THE DRAWINGS

FIG. 1 is a simplified view in perspective of a forklift truck having on it an attachment embodying the principles of the invention, the forks and attachment being shown in the normal transporting position. The rear wheels do not show in this view because of being obscured by the truck chassis.

FIG. 2 is a view similar to FIG. 1 but with the forks lifted and the platform of the attachment extended to one side. This view also shows portions of the racks for storage on which the load is about to be deposited.

FIG. 3 is a view in side elevation of an attachment like that of FIG. 1 embodying the principles of the invention, with a skid pallet shown thereon in phantom. Te hydraulic jacks are omitted from this view.

FIG. 3A is a fragmentary view of a portion of FIG. 3 showing the location of one of the hydraulic jacks, omitted from FIG. 3 but shown here.

FIG. 4 is a view in front elevation of the attachment of FIG. 3, with the stabilizer moved to one side and resting on a storage rack and the platform somewhat moved to one side. A cover plate has been removed and some of the wire ropes are broken off to avoid confusion.

FIGS. 5 through 8 are simplified views in front elevation of the attachment and are generally similar to FIG. 4 but show the load-supporting and intermediate platforms and the stabilizer in various positions of an unloading operation utilizing a skid pallet, as follows.

FIG. 5 shows the stabilizer alone extended to one side and resting in position on the storage rack so that full support has been achieved, FIG. 6 is similar to FIG. 5 but the load-supporting platform is tipped preparatory to extension, so that the pallet skids will be able to clear the storage racks, FIG. 7 shows the load-supporting platform fully extended and still tipped so that the pallet skids have cleared the storage racks, and FIG. 8 shows the load-supporting platform still fully extended but tipped in the opposite direction for depositing the load and to enable retraction of the platform.

FIG. 9 is a view in side elevation and partly in section taken along the line 9—9 in FIG. 10 showing a modified type of operation where the load is supported on a double-faced pallet instead of a skid pallet.

FIG. 10 is a view taken along the line 10—10 in FIG. 9.

FIG. 11 is an enlarged top plan view of the device with the platforms and stabilizer removed to show the drive mechanisms and their alignment with each other.

FIG. 12 is a front elevation view looking at FIG. 10 from the bottom edge.

FIG. 13 is a fragmentary top plan view of the unit on a forklift truck with the platforms and stabilizer extended to the left and with the stabilizer in its supporting position engaging a rack.

FIG. 14 is an enlarged top plan view, partly in section, of the two outer drums of the drive mechanism of FIG. 11.

FIG. 15 is a top view of one of the drums of FIG. 14 without the wire rope showing the anchorage for the wire rope.

FIG. 16 is a view of the drum of FIG. 15 in a different rotational position.

FIG. 17 is a view in section taken along the line 17—17 in FIG. 16, with a wire rope anchored in place.

FIG. 18 is an enlarged view in side elevation taken along the line 18—18 in FIG. 11 and showing the array of microswitches controlling the operation of the platforms and stabilizer.

FIG. 19 is a top plan view of the arrangement of FIG. 18.

FIG. 20 is a view in front elevation of the tilt arm for the platforms, showing its tipping in one direction.

FIG. 21 is a similar view with the tilt arm tipping in the opposite direction.

FIG. 22 is a view of one of the hydraulic jacks for the tilting.

FIG. 23 is an electrical circuit diagram for the device.

FIG. 24 is a simplified front elevation view of the wire rope system for one side of one member, the others being omitted to avoid confusion, since all of the wire rope systems are basically alike except for readily apparent modification in location and attachment.

DESCRIPTION OF A PREFERRED EMBODIMENT

Any standard type of fork-loading truck known to the inventors can be equipped with an attachment 30 embodying the principles of this invention. FIGS. 1 and 2 show one such forklift truck 31 having wheels 32 (the rear wheels being not visible in these views), a body 33, a driver's seat 34, a rear counterbalance portion 35, a pair of vertical columns or masts 36 and 37, and a pair of forks 38 and 39 which are adapted to move up and down along the vertical columns or masts 36 and 37. The particular type of forklift truck 31, here illustrated, when without the attachment 30, loads and unloads only head-on, in line with the fore-and-aft axis. The invention may also be applied to forklift trucks where the forks can be rotated or used in other positions, but some of the advantages are lost thereby. Also, the attachment 30 of this invention is not limited to use with counterbalanced forklift trucks. It can also be used with "order pickers" and with other trucks having forks which do not have a counterbalance, so long as these trucks are able to carry a load in some manner. The attachment 30 itself insures the ability of sending the load out to either side of the truck 31 and provides its own stabilization, so that so far as the attachment is concerned, the presence or absence of a counterbalance does not matter.

The attachment 30 (see FIGS. 1–4) comprises a base frame 40 having a pair of rectangular tubes or socket members 41 and 42 in which the forks 38 and 39 are readily inserted. The entire attachment 30 is made so that it can be not much larger than the size of a pallet. The sockets or tubes 41 and 42 are big enough so that it is easy to insert the forks 38 and 39, which fit rather loosely inside these tubes 41 and 42. However, one very important feature of the present invention is the provision of a series of set-bolts 43 which extend up through threaded openings in the bottom wall of each tube 41, 42 at several chosen locations. After insertion of the forks 38 and 39, the bolts 43 are turned until they firmly clamp the forks 38 and 39 to the upper walls of the tubes 41 and 42. Thereafter, the attachment 40 can be considered to act to secure the forks 38 and 39 against rotation relative to each other, and therefore they are secured against inducing wrack into the masts 36 and 37 and transmit forces that are urged, against the frame 40 directly to the frame 33 of the lift truck 31.

The socket members or tubes 41 and 42 are joined by and welded to a pair of parallel lateral beams 44 and 45. Each of the beams 44 and 45 supports a cylindrical pivot member 46, 47 located along the fore-and-aft axis of the base frame 40. In addition, the base frame 40 includes plates 48 and 49 secured to the beams 44 and 45. The plate 48 supports two hydraulic motors 50 and 51 that furnish the power for the drive mechanism later to be discussed, while the plates 49 support a microswitch relay array 52 that provides safety interlocks, as will be explained later.

The beams 44 and 45 support an upper assembly 55, which includes the movable portions of the attachment 30 and their supports. Thus, a pair of channels 56 and 57 are bolted to the beams 44 and 45 and a pair of tilt bars 58 and 59 are pivotally supported by the pivots 46 and 47, through central depending ears 53 of the tilt bars 58 and 59.

The upper assembly 55 of the attachment 30 includes a laterally movable platform 60 which carries the actual load, usually supporting directly the pallet which supports the load itself. This platform 60 is attached to and supported by two channel-shaped members 61 and 62 having channels 63 and 64.

The upper assembly 55 also includes a central stabilizer 65, which is located beneath the platform 60 centrally, in between the two side channel members 61 and 62, and is provided with series of rollers 66 and 67, which ride in the channels 56 and 57, so that the stabilizer 65 is supported by the base frame 40 independently of the platform 60. A basic idea of the invention is that the stabilizer 65 does not carry any of the pay load besides its own weight; during operation, it is moved laterally out to one side to a position where it rests on a horizontal member of a storage rack 100 (or other suitable support) before the platform 60 is, or normally can be, moved. Also, the stabilizer 65 never tilts, as does the platform 60. This means that the attachment 30 automatically makes it certain that the movement, unloading, or picking up of the load will not unbalance the forklift truck 31. Only after the stabilizer 65 is in its proper position is the platform 60 moved out beyond its centered normal transporting position.

The load supporting platform 60 is part of a structure which is supported by the tilt arms 58 and 59. There is also an intermediate platform 70, which bridges between and is secured to two strong beams 71 and 72. The beams 71 and 72 respectively carry inner rollers 73 and 74, which ride inside channels provided by the tilt arms 58 and 59, and therefore these rollers 73 and 74 ride up or down any incline at which the tilt members 58 and 59 and their channels may then have. The beams 71 and 72 also carry a pair of outer rollers 75 and 76, and these outer rollers 75 and 76 ride in the channels 63 and 64 of the members 61 and 62, which, as stated before, are bolted to the load-supporting platform 60.

Omitted from FIG. 3, but indicated in FIG. 3A and shown in FIGS. 4, 11, 20, and 21 are a series of hydraulic jacks 80, 81, 82, and 83. One jack 80 is shown in section in FIG. 22; the others are identical. These jacks are all secured to the base frame 40, and their purpose is to engage the tilt bars 58 and 59 and to cause them to assume any desired angular position relative to the base frame 40, whether level or tipped in either of two directions. These hydraulic jacks 80, 81, 82, 83 work in pairs, so that the two jacks 80 and 81 on one side of center operate to go up exactly the same amount that the two jacks 82 and 83 on the other side of center go down, and vice versa. The jacks 80, 81, 82, and 83 are all spaced the same distance from the fore-and-aft axis of the base frame 40. Thus, by well known means, the hydraulic mechanism is adjusted so that when the jacks 80 and 81 rise, the jacks 82 and 83 go down in exactly the same amount, so that all four jack pistons are always in contact with the tilt bars 58 and 59, as shown in FIGS. 20 and 21.

The significance and purpose of this tilting structure is to enable the attachment 30 to operate satisfactorily both with skid pallets which are taller than the upper assembly 55 and also with double-face pallets and even flat pieces of wood that are not strictly pallets. This tilting feature enables the attachment 30 to load pallets of either type onto a storage rack 100 without causing contact between the pallet and the storage rack 100 or auxiliary members thereon, and it also enables retraction of the upper assembly 55 from a pallet that has been moved from the forklift truck 31 onto the storage rack 100. Further, it enables insertion of the upper assembly 55 into or beneath a pallet which is already on place on the storage rack 100, previous to the picking up of a load, and it then enables actually moving the load away from the rack 100. Indeed, it is not essential to have a rack, if the materials being handled can support stacking of a loaded pallet over a loaded pallet. As stated before, the stabilizer 65 does not tilt, so that forces imposed on it are transmitted directly to the frame 40 and thereby through the locked-in-place forks 38 and 39 to the forklift truck 31. It will be shown below how the stabilizer 65 is related to the operation of the load-supporting platform 60 by the microswitch interlock mechanism 52.

The direction of tilt is governed by a pair of solenoids 84 and 85 (see FIG. 11) one of which when actuated causes a tilt so that the left-hand side is, as viewed in FIG. 4, tipped upwardly by the jacks 80, 81, 82 and 83, and the other of which, when actuated, causes the right-hand side to be tipped upwardly by the same jacks. When one side is tipped upwardly, the other side is tipped downwardly.

Four more solenoids are shown in FIG. 11. Solenoids 86 and 87 each cause the hydraulic motor 50 to rotate in one of its two opposite directions, and solenoids 88 and 89 each cause the hydraulic motor 51 to rotate in one of its two opposite directions.

As stated in the introduction, the attachment 30 has a novel drive mechanism which employs the hydraulic motors 50 and 51 in connection with a system relying on wire ropes. The motor 50 is connected to a drive shaft 90, and the motor 51 is connected to a parallel drive shaft 91. The drive shaft 91 is located along the axis of the base frame 40 and carries three drums 92, 93, and 94 on it, of which the outer two drums 92 and 94 are secured to the shaft 91, while the central drum 93 is merely mounted on it for free rotation and centering and is driven, via a chain drive 95, by the drive shaft 90. The idea is that by this means, the two shafts 90 and 91, which are not co-axial, can be used to drive co-axial drums 92, 93, and 94, so that all three of the driving drums 92, 93, and 94 lie on the central axis.

Three pairs of wire ropes are used, one pair for each drum, one end of each wire rope being attached to its drum and one end to either the stabilizer 65 or to the intermediate member 70. Thus, the drum 92 is attached to wire ropes 101 and 102; the drum 93 is attached to wire ropes 103 and 104, and the drum 94 is attached to wire ropes 105 and 106. Each of these wire ropes is wound several times around its drum and then passes via a pulley to its anchor. Pulleys 107 and 108 in FIG. 11 are used with the respective wire ropes 103 and 104 for the stabilizer 65. Thus the wire rope 103 goes from the drum 93 to the left as seen in FIG. 11 to the pulley 107 and then goes to the right and is anchored to the right end of the stabilizer 65. Similarly, the wire rope 104 goes from the drum 93 via the pulley 108 to the left end of the stabilizer 65, where it is anchored.

The connections for driving the platform 60 are more complicated and require four additional wire ropes, exemplified in FIG. 24 by a wire rope 127. The wire ropes 101, 102, 105, and 106 go respectively from their drums 92 and 94 to pulleys 110, 111, 112, 113 and from there go to anchorages 116, 117 (see FIG. 3) and two others not shown. Each wire rope 101, 102, 105, and 106 is anchored near one end of the beams 71 and 72 that are secured to the intermediate platform 70 and serve to move the platform. For example, see in FIG. 24 where the cable 101 is shown passing from the drum 92 to the left, going around the pulley 110 and then going to the right to its anchorage 116 on the beam 72.

Four other pulleys are mounted on the shafts for the rollers 75 and 76 (see FIG. 3) that is to the four rollers that are furthest from center, two on each side. Thus, the pulley 114 is associated with one roller 76, and the pulley 115 is associated with a roller 75. There is a separate wire rope for each of these pulleys, and they are in pairs, two for each side of the device and two for each end. Thus there is a wire rope (not shown) parallel to the wire rope 127 on the opposite edge of the attachment 30, and there is another pair of wire ropes making a mirror image thereof. The wire rope 127 is sufficient to describe; the others are all like it or symmetrical to it.

The wire rope 127 is secured to the frame 40 at an anchor 118, passes around a pulley 129 that is rotatably mounted on the frame 40, goes to the left to the pulley 114 which has its shaft secured to the intermediate platfrom 70, or rather to the beam 72 thereof, and then goes back to the right to an anchor 128 or the member 62 which supports the platform 60. Since the wire rope 127 has a movable pulley 114 — i.e., the pulley 114 is moving with its roller 76 and is moving laterally at the same speed as the intermediate platform 70, the wire rope 127 pays out and takes up its slack in two runs and therefore moves the platform 60 at twice the speed of the intermediate platform 70.

As stated, each wire rope is wound around its drum enough to give a needed storage capacity for unwinding in one direction, and is in driving engagement with one of the drums, so that each drum has two wire ropes associated with it, each drum having an anchor for those wire ropes, and each wire rope having an anchor also on either the stabilizer 65 or the intermediate platform 70, after it passes around its respective pulley. The outside drums 92 and 94 are rotated as desired by the motor 51 to whatever amount they should be rotated to secure the necessary movement of the platform 60, and as this is done, one wire rope is winding up around its drum while the other unwinds from that drum, and the platform 70 therefore moves laterally. The movement of the stabilizer 65 is similar.

FIGS. 15, 16, and 17 show the means by which the wire ropes are anchored to the drums. Thus, the drum 92 has two tubular openings 120 and 121 for the wire ropes 101 and 102, with an enlarged bore portion 122 in each opening 120 and 121 providing a shoulder 123 on which the balled end 124 of the wire rope 101 or 102 rests for anchorage. This means that the wire ropes are easily installed and easily removed if repairs should be necessary. These anchorages for all the wire ropes are substantially the same.

The stabilizer 65 preferably carries at each outer end a pressure operated switch 125 (see FIG. 23) which comprises a large-area spring mounted plate 126 (see FIGS. 3 and 13), which is moved upwardly against the pressure of its spring when the stabilizer 65 is lowered to make contact from above with a storage rack 100. When the operator (using the mast controls) slightly lowers the forks 38 and 39 at that time, the stabilizer 65 descends and the plate 126 makes contact with the storage rack 100; it then stays stationary while further downward movement of the stabilizer 65 compresses the spring until electrical contact is made. At that point, the lowering circuit is disabled, and the operator is unable under normal conditions to move the stabilizer 65 — or the forks 20, 39 — downwardly any further. This automatically assures that the stabilizer 65 will be in the correct position, and this disabling switch 125 therefore determines that the stabilizer 65 has made its proper load-supporting and stabilizing contact. Also, only after that contact has been made is it possible (except with the override, explained later) to move the load platform 60 laterally.

Thus, this attachment 30 has the important safety feature that when the stabilizer 65 has made the contact with the rack 100 and thrown the switch 125, the masts and forks of the forklift truck 31 can move down no further, the operator can still move the forks up, if he wants to, as he will of course do at a later time, but he will not do that at this stage of operation. Another safety feature is, as mentioned, that with the safety circuit in control, until the switch 125 is actuated, the platform 60 cannot be moved, and a further safety feature is that when the switch 125 is actuated, it enables the platform 60 to be moved only in the direction to which the stabilizer 65 has been extended, because of the effect of the switch 125 on the solenoids 88 and 89 that determine the direction of movement of the motor 51 for the platform 60, as will be described below. (Again overrides can be used in exceptional cases.)

FIGS. 5–8 show an unloading operation with a skid pallet 130 having skids 131 that lie below the lowest part of the upper assembly 55. As shown in FIG. 5, the operator has previously raised the forks 38 and 39 to lift the attachment 30 to a height where the bottom of the stabilizer 65 and its switch plate 126 are higher than a horizontal member 132 of the rack 100, on which the stabilizer 65 is to rest. The operator determines this height relationship visually, usually giving himself plenty of leeway. Then he moves the stabilizer 65 out laterally far enough so that its outer end is little beyond the storage rack portion 132. This he also determines visually. Then he lowers the forks 38 and 39 until the switch plate 126 first makes contact with the rack portion 132 and then actuates the switch 125. Then, automatically, the lowering is stopped, for the stabilizer 65 has reached its proper position.

The operator then can manually actuate the movement of the platform 60. However, before doing this, as shown in FIG. 6 he first tilts the platform 60 in the proper direction, depending on whether he is picking up a load or depositing a load. If he is depositing a load, as here, the outer end will be higher than the inner end, and it will be the reverse when he is sending the platform 60 in to pick up a load. Having achieved the proper tilt for unloading, as shown in FIG. 6, and having the stabilizer 65 properly supported, he can cause the platform 60 to move outwardly without risking contact between the rack member 132 and the skids 131, and the platform 60 will move out until the operator stops it or until it actually reaches its extreme position, shown in FIG. 7.

At that time, supposing at first that the operator has a load on the platform 60, the platform 60 is still tipped (FIG. 7). So he then causes the solenoids 84 and 85 governing the hydraulic jacks 80, 81, 82, 83 to be actuated, to cause the hydraulic circuit to move in the opposite direction and therefore to raise the inner end and tilt the outer end downwardly. This first deposits the pallet 130 on the rack 100 and then enables the platform 60, which has heretofore been concerned with holding the load high enough so that it will clear the storage rack 100, to descend to its FIG. 8 position until the operator can withdraw the platform 60 by causing it to move in the opposite direction back towards center. The load is picked up from the storage rack 100 by following the same steps in reverse order.

FIGS. 9 and 10 show the difference encountered when a double-faced pallet 135 has been placed on the attachment 130. The storage rack 100 is here shown as provided with a pair of wooden or metal beams 136, 137, which are loose and may be, for example, a pair of 6 × 6's. The beams 136 and 137 are further apart than the width of the stabilizer 65 and are closer together than the width of the pallet 135. This is one of several ways of adapting the rack 100 to double-faced pallets with the use of this invention, all of which have basic similarities. It is again necessary to tilt the outer end of the platform 60 upwardly in order for the pallet 135 to clear the beams 136 and 137 when the platform 60 is moved outwardly. This tilt accomplished, the platform 60 is moved out, and then when so moved, its outer end is tilted downwardly to enable retraction. Re-entry is obtained with the outer end tilted downwardly, and then the outer end is tilted upwardly for carrying the load from the storage rack 100 to the centered position on the truck 31.

FIGS. 18 and 19 show an array 52 of control switches, which are mechanically actuated in accordance with the movement of the stabilizer 65 or of the pallet-supporting platform 60. Three shafts 140, 141, and 142 carry pulleys 143, 144, and 145, around which travels a belt 146. The shaft 140 is driven by the drive shaft 90, the shaft 141 is an idler, and the shaft 142 carries a pinion gear 147 that engages and moves a rack 148, which actuates a lower row of the array of switches, comprising two inner switches 150 and 151, and outer switches 153 and 154.

The shaft 191 is connected directly to a shaft 91a, which drives a pinion 155 and a rack 156. This rack 156 actuates a switch 160 in the center, inner switches 161 and 162 and outer switches 163 and 164. The pinion 147 and rack 148 reduce the movement of the shaft 90, and the pinion 155 and rack 156 reduce the movement of the shaft 91, so that the array 52 has a scaled relationship to the platform movement; i.e., 1 inch of movement of either rack 148 or 156 corresponds to 6 inches of movement, respectively, of the stabilizer 65 or platform 60.

The electrical circuit is shown in FIG. 23. The switches 150a, 150b, 150c; and 151a, 151b, 151c are compound switches having, respectively, poles 150a, 150b, 150c and 151a, 151b, 151c. Three manual switches are normally used by the operator.

(1) A tilt switch 170 enables operation of the solenoids 84 and 85 that control the hydraulic jacks 80, 81 82 and 83. A relay 171 is energized by the switch 150a when the platform 60 moves to the right to reverse the tilt operation through relay switches 172 and 173, so that a tilt "up" means a tilt up of the outward end of the platform 60 whether the platform 60 is to the left or right of the frame 40.

(2) A stabilizer switch 174 determines movement of the stabilizer 65 to the left or right by actuating either the solenoid 86 or the solenoid 87.

(3) A platform switch 175 determines whether the platform 60 moves to the left or to the right by actuating either the solenoid 88 or the solenoid 89.

There is one further manual switch:

in the event that either of the switches 125 and 125a should fail when the platform 60 is extended, a manual override switch 176 (normally open) enables the operator to get the platform 60 back to center; it can also be used for other situations where the operator needs control.

The stabilizer sensing switches 125 and 125a (one on one end of the stabilizer, the other on the other end) are usually in their non-actuated solid-line positions. They are each in series with a solenoid 166, through respective switches 150b and 151b, and when either of them is closed (to the dotted-line position in FIG. 23), they energize the solenoid 166 which immediately prevents further lowering of the masts 36, 37 and forks 38, 39 of the forklift truck 31.

Similarly, the normally open switch 160 is closed when the platform 60 is moved off center, and it is in series with a solenoid 167, which, when energized, prevents raising of the masts 36, 37 and forks 38, 39.

The switches 150c and 151c prevent actuation of their respective solenoids 88 and 89, and thereby prevent movement of the platform 60 in a direction opposite to that in which the stabilizer 64 has moved.

Extreme limit switches 150, 151, 163, and 164 limit the extension of the stabilizer 65 and platform 60, respectively, by breaking the circuit to the pertinent solenoid 86, 87, 88, or 89, when such an extreme limit is reached.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A side-loading attachment for a device having a support portion and means for raising and lowering said support portion vertically, said attachment being used in conjunction with load-supporting pallets and storage means for supporting loaded said pallets, including in combination:

a base frame for support by said support portion,
means for locking said base frame to said support portion to prevent relative vertical movement between said base frame and said support portion,
a pair of laterally extending channel members rigidly secured to said base frame and lying thereabove,
a stabilizer laterally disposed with respect to said base frame, said stabilizer having at each side thereof a plurality of rollers riding in and on said channel members for sidewise movement of said stabilizer, laterally of said base frame, whereby said stabilizer never tilts relative to said base frame,
means for moving said stabilizer laterally,
fore-and-aft extending pivots on the fore-and-aft axis of said base frame,
an upper frame pivotally supported on said pivots so as to be tiltable relative to said base frame,
a pallet-and-load-supporting platform supported by said upper frame at a level above said stabilizer, at all times supported separately from said stabilizer for movement wholly independently of said stabilizer, for movement relative to said upper frame in line with the pivotal position thereof,
a plurality of hydraulic jacks on each side of said base frame and in contact with said upper frame for leveling said upper frame relative to said base frame and for tipping it in either direction, the jacks on one side of said axis raising while the jacks on the other side lower and vice versa, and
platform moving means for moving said platform out where it lies wholly beyond said device.

2. The side-loading attachment of claim 1 having pressure-actuated switch means secured to said stabilizer adjacent each end thereof and actuated when compressed between a said storage means and said stabilizer,
means for connecting each said pressure-actuated switch means in a controlling relation to said means for raising and lowering said support portion, so that when said switch means is so connected and when said attachment has been raised and when said stabilizer has been moved laterally to where an end portion thereof lies vertically adjacent said storage means, then upon vertical movement of said support portion, said switch member comes into contact with said storage means, and shortly thereafter is actuated by further vertical movement of said stabilizer in the same direction and when said switch means is so actuated, it acts upon said means for raising and lowering to prevent further vertical movement in that direction of said support portion.

3. The side-loading attachment of claim 2 having control means for said platform moving means connected to said pressure-actuated switch means and enabling operation of said platform moving means only when said switch means has been actuated and then enabling movement of said platform beyond said frame only in one direction.

4. A side-loading attachment for a device having a support portion and means for raising and lowering said support portion vertically, said attachment being used in conjunction with load-supporting pallets and storage means for supporting loaded said pallets, including in combination:

a base frame for support by said support portion,
means for locking said base frame to said support portion to prevent relative vertical movement between said base frame and said support portion,
a stabilizer laterally disposed with respect to said base frame and supported thereon for movement laterally thereof,
means for moving said stabilizer laterally,
a pallet-and-load-supporting platform laterally supported by said base frame at a level above said stabilizer and supported by said frame at all times separately from said stabilizer for movement wholly independently of said stabilizer, and
platform moving means for moving said platform out where it lies wholly beyond said device,
said means for moving said stabilizer and said platform moving means comprising
a first drive shaft rotatably supported by said base frame along the fore-and-aft axis thereof,
a second drive shaft rotatably supported by said base frame parallel to and spaced from said first drive shaft,
first drive means for driving said first drive shaft,
second drive means for driving said second drive shaft,
a first drum rotatably mounted on said first drive shaft,
transmission means connecting said first drum to said second drive shaft for drive thereby, second and third drums secured to said first drive shaft, one on each side of said first drum, and driven by said first drive shaft, first, second, and third pairs of wire ropes, one for each said drum and corresponding thereto in order with one end of each secured to its said drum, means anchoring the other end of each of said first pair of wire ropes to said stabilizer, pulley means on said base frame guiding said first pair of wire ropes from said first drum to opposite ends of said stabilizer, for moving it in either direction, pulley means on said base frame guiding said second and third pairs of wire ropes from said second and third drums, and means for operatively connecting said second and third wire ropes for moving said platform in either direction.

5. The side-loading attachment of claim 4 having first and second series of interlock and limit switches, each series being arranged in a line having a center point with some switches on each side of said center point, first and second mechanically movable switch actuating means, one for each said series, movable parallel to said line, and first and second rotary-to-linear convertors driven respectively by said first and second drive shafts and connected to said switch actuating means.

6. The side-loading attachment of claim 5 having an electrical circuit including both said series of switches and also including solenoids for determining the direction of drive of said first and second drive means, said second series of switches including a pair of interlock switches, one on each side of said center point preventing actuation of said first drive means until one said interlock switch is actuated and connected in said circuit to said solenoids such that said first drive means can thereupon move said first drive shaft only in the direction moving said platform in the same direction as said stabilizer has been moved.

7. The side-loading attachment of claim 6 wherein each said series of switches includes limit switches on each side of said center limiting the movement of both said stabilizer and said platform to a predetermined maximum amount.

8. The side-loading attachment of claim 6 wherein said first series of switches has one switch located on said center point and actuated by movement of said platform from center to prevent vertical movement of said support means thereafter in a direction tending to unseat said stabilizer.

9. A side-loading attachment for a device having support means and means for raising and lowering said support vertically, used in conjunction with load-supporting pallets and storage means for supporting loaded said pallets, including in combination:

base frame means for said attachment for rigid support by said support means and for preventing relative movement between said support means and said base frame, a stabilizer laterally disposed with respect to said base frame and supported thereon for movement laterally thereof, telescopically relative to said stabilizer, a pallet-and-load-supporting platform laterally supported by said base frame at a level above said stabilizer and supported by said frame at all times separately from said stabilizer for movement wholly independently of said stabilizer, a first drive shaft rotatably supported by said base frame along the fore-and-aft axis thereof, a second drive shaft rotatably supported by said base frame parallel to and spaced from said first drive shaft, first drive means for driving said first drive shaft, second drive means for driving said second drive shaft, a first drum rotatably mounted on said first drive shaft, transmission means connecting said first drum to said second drive shaft for drive thereby, second and third drums secured to said first drive shaft, one on each side of said first drum, and driven by said first drive shaft, first, second, and third pairs of wire ropes, one pair for each said drum, with one end of each secured to its said drum, means anchoring the other end of each of said first pair of wire ropes to said stabilizer, pulley means on said base frame guiding each of said first pair of wire ropes from said first drum to opposite ends of said stabilizer, for moving it in either direction, and connection means operatively connecting each of said second and third pairs of wire ropes from said second and third drums to said platform for moving it in either direction.

10. The side-loading attachment of claim 9 having an intermediate platform laterally disposed above said base frame and supported thereon in between said pallet-and-load-supporting platform and said stabilizer for lateral movement telescopically relative to said stabilizer and said pallet-and-load-supporting platform, said connection means comprising a pulley for each said wire rope of said second and third pair, mounted on said base frame, anchor means for each said wire rope of said second and third pair at one end of said intermediate platform, fourth and fifth pairs of wire ropes, each having opposite ends anchored to said pallet-and-load-supporting platform and said base frame on corresponding ends thereof, and pulley means on said intermediate platform on the end opposite from where each said fourth and fifth pairs of wire ropes are anchored, each engaging one said wire rope for movement of said pallet-and-load-supporting platform at twice the speed of said intermediate platform.

11. The side-loading attachment of claim 10 having a pair of laterally extending channel members rigidly secured to said base frame and lying thereabove, said stabilizer having at each side thereof a plurality of rollers riding in and on said channel members for the sidewise movement of said stabilizer.

12. The side-loading attachment of claim 10 having fore-and-aft extending pivots on the fore-and-aft axis of said base frame, an upper frame pivotally supported on said pivots and supporting said pallet-and-load-supporting platform and said intermediate platform for movement relative thereto laterally in line with the pivotal position thereof, and a plurality of hydraulic jacks on each side of said base frame and in contact with said upper frame for leveling said upper frame relative to said base frame and for tipping it in either direction, the jacks on one side of said axis raising while the jacks on the other side lower and vice versa.

13. A side-loading attachment for a forklift truck having electrically controlled means for raising and lowering its forks vertically, used in conjunction with load-supporting pallets and storage racks for supporting loaded said pallets; including in combination:

a base frame having a pair of fork-receiving tubes by means of which said attachment can be supported by the forks of said forklift truck and raised and lowered thereby, means for locking said forks against said tubes to prevent relative movement between said forks and said tubes, a stabilizer laterally disposed with respect to said base frame and supported thereon for movement laterally only thereof in either direction, said stabilizer having a lower surface, means for moving said stabilizer laterally to any desired position, so that it can lie above a preselected member of said storage rack at a location where a said pallet and its load are to be deposited, a pallet-and-load supporting platform laterally supported by said base frame at a level above said stabilizer and supported pivotally by said frame at all times separately from said stabilizer for lateral and tilting movement wholly independently of said stabilizer, and platform moving means for moving said platform out where it lies wholly beyond said forklift truck.

14. The side-loading attachment of claim 13 having pressure actuated switch means secured to said lower surface of said stabilizer adjacent each end thereof and actuated when resting on a said rack member by a short downward movement of said stabilizer, means for connecting each said switch means in a controlling relation to said electrically controlled means for raising and lowering said forks, so that when said switch means is so connected and when said attachment has been raised above a said rack member and when said stabilizer has been moved laterally to where an end portion thereof lies vertically above said rack member, then upon lowering of said forks, said switch member comes into contact with said rack member and shortly thereafter is actuated by further lowering of said stabilizer and when said switch means is so actuated, it acts upon said electrically controlled means to prevent further lowering of said forks, control means for said platform moving means connected to said switch means and enabling operation of said platform moving means only when said switch means has been actuated and for then enabling movement of said platform beyond said frame only on the same side as that to which said stabilizer has been moved.

* * * * *